United States Patent
Pirk et al.

(10) Patent No.: US 10,490,804 B2
(45) Date of Patent: Nov. 26, 2019

(54) METHOD FOR PRODUCING A GALVANIC ELEMENT AND GALVANIC ELEMENT

(71) Applicant: Robert Bosch GmbH, Stuttgart (DE)

(72) Inventors: Tjalf Pirk, Stuttgart (DE); Dominik Hanft, Bayreuth (DE); Michael Butzin, Stuttgart (DE); Christine Engel, Vaihingen/Enz Ensingen (DE); Ralf Moos, Bayreuth (DE)

(73) Assignee: Robert Bosch GmbH, Stuttgart (DE)

( * ) Notice: Subject to any disclaimer, the term of this patent is extended or adjusted under 35 U.S.C. 154(b) by 380 days.

(21) Appl. No.: 14/758,094

(22) PCT Filed: Dec. 19, 2013

(86) PCT No.: PCT/EP2013/077311
§ 371 (c)(1),
(2) Date: Jun. 26, 2015

(87) PCT Pub. No.: WO2014/102131
PCT Pub. Date: Jul. 3, 2014

(65) Prior Publication Data
US 2015/0333314 A1    Nov. 19, 2015

(30) Foreign Application Priority Data
Dec. 27, 2012    (DE) .................. 10 2012 224 377

(51) Int. Cl.
*H01M 4/04*    (2006.01)
*H01M 2/14*    (2006.01)
(Continued)

(52) U.S. Cl.
CPC .......... *H01M 4/0402* (2013.01); *C23C 24/04* (2013.01); *H01M 2/145* (2013.01);
(Continued)

(58) Field of Classification Search
CPC .... H01M 4/0402; H01M 4/0419; H01M 4/13; H01M 4/624; H01M 4/62; H01M 2/145;
(Continued)

(56) References Cited

U.S. PATENT DOCUMENTS

2005/0141170 A1* 6/2005 Honda .................... B32B 27/08
361/311
2007/0117008 A1* 5/2007 Kaneko ............... H01M 2/1653
429/152
(Continued)

FOREIGN PATENT DOCUMENTS

CN    101617420 A    12/2009
JP    2005-078985 A    3/2005
(Continued)

OTHER PUBLICATIONS

International Search Report corresponding to PCT Application No. PCT/EP2013/077311, dated Jun. 25, 2014, (German and English language document) (8 pages).
(Continued)

*Primary Examiner* — Eugenia Wang
(74) *Attorney, Agent, or Firm* — Maginot, Moore & Beck LLP

(57) ABSTRACT

A method for producing a galvanic element includes applying a first electrode to a substrate, applying a separator to the first electrode, and applying a second electrode to the separator. At least one of the electrodes is applied in the form of a composite electrode using an aerosol separation method.

9 Claims, 4 Drawing Sheets

(51) Int. Cl.
*H01M 2/16* (2006.01)
*H01M 4/62* (2006.01)
*H01M 10/04* (2006.01)
*H01M 6/40* (2006.01)
*H01M 4/13* (2010.01)
*C23C 24/04* (2006.01)

(52) U.S. Cl.
CPC ....... *H01M 2/1673* (2013.01); *H01M 4/0419* (2013.01); *H01M 4/624* (2013.01); *H01M 6/40* (2013.01); *H01M 10/0436* (2013.01); *H01M 4/13* (2013.01); *H01M 4/62* (2013.01); *H01M 2300/0068* (2013.01)

(58) Field of Classification Search
CPC .. H01M 2/1673; H01M 6/40; H01M 10/0436; H01M 2300/0068; C23C 24/04
See application file for complete search history.

(56) References Cited

U.S. PATENT DOCUMENTS

| | | | |
|---|---|---|---|
| 2009/0191460 A1* | 7/2009 | Fujiwara | H01M 4/0402 429/209 |
| 2011/0051320 A1* | 3/2011 | Miller | H01G 9/02 361/524 |
| 2011/0070365 A1 | 3/2011 | Kawaoka | |
| 2011/0143019 A1* | 6/2011 | Mosso | C23C 16/0209 427/58 |
| 2011/0217585 A1 | 9/2011 | Wang et al. | |
| 2011/0300432 A1 | 12/2011 | Snyder et al. | |
| 2013/0323583 A1* | 12/2013 | Phares | H01M 4/0402 429/209 |
| 2014/0178769 A1* | 6/2014 | Pirk | H01M 10/052 429/322 |
| 2015/0027615 A1* | 1/2015 | Singh | H01M 10/04 156/60 |

FOREIGN PATENT DOCUMENTS

WO  2012/066405 A1  5/2012
WO  WO-2012159786 A1 * 11/2012 .......... H01M 10/052

OTHER PUBLICATIONS

Jun Akedo; "Room Temperature Impact Consolidation (RTIC) of Fine Ceramic Powder by Aerosol Deposition Method and Applications to Microdevices"; Journal of Thermal Spray Technology; Jun. 2008; pp. 181-198; vol. 17(2) (18 pages).

* cited by examiner

METHOD FOR PRODUCING A GALVANIC ELEMENT AND GALVANIC ELEMENT

This application is a 35 U.S.C. § 371 National Stage Application of PCT/EP2013/077311, filed on Dec. 19, 2013, which claims the benefit of priority to Serial No. DE 10 2012 224 377.1, filed on Dec. 27, 2012 in Germany, the disclosures of which are incorporated herein by reference in their entirety.

BACKGROUND

The present disclosure relates to a method for producing a galvanic element and to a galvanic element.

For many fields of application very flat batteries are required. Such a micro battery is described, for example, in US 2011/0300432 A1.

The publication Akedo; "Room Temperature Impact Consolidation (RTIC) of Fine Ceramic Powder by Aerosol Deposition Method and Applications to Microdevices", J. Th. Spray Technol., 2008 describes an aerosol deposition method.

SUMMARY

Against this background, the present disclosure presents a method for producing a galvanic element and a galvanic element. Advantageous refinements can be found in the respective dependent claims and the following description.

An aerosol deposition method (ADM) can be used to produce a galvanic element. In this context, in particular at least one electrode of the galvanic element can be produced using aerosol deposition.

A method for producing a galvanic element comprises the following steps:
providing a substrate;
applying a first electrode to the substrate;
applying a separator to the first electrode; and
applying a second electrode to the separator, wherein at least one of the electrodes is applied in the form of a composite electrode using an aerosol deposition method.

The galvanic element can constitute a battery or an accumulator. For example, it can be a micro battery. The substrate can be a rigid or a flexible element. The first electrode can be applied to a surface of the substrate. The first electrode can be a cathode and the second electrode can be an anode of the galvanic element, or vice versa. The separator can be designed to conduct ions between the first electrode and the second electrode. The electrodes and the separator can each be in the form of layers. These may be thin layers in the nanometer range or micrometer range. According to different embodiments, one of the electrodes, both electrodes, one electrode and the separator or both electrodes and the separator can be applied by aerosol deposition. During the aerosol deposition, one or more powders, materials or substances which are suitable for forming a layer can be applied to a surface via one or more nozzles, in order to form the layer on the surface. An aerosol can be understood to be a mixture of solid substances which are present, for example, in the form of a powder or particles and a gas. The gas can be used to apply the substances in the form of a particle jet at high speed to the surface.

The composite electrode can be deposited from one or more powder mixtures with different substances using an aerosol deposition method. The powder mixture or the powder mixtures can contain conduction network material for forming a multiplicity of conduction networks within the composite electrode and active material for storing ions within the composite electrode.

In the step of applying the electrode in the form of the composite electrode, different substances can be applied using the aerosol deposition method in order to form the composite electrode. The different substances can be connected during the deposition process in order to form the composite electrode. By means of the different substances it is possible to form different functional structures within the composite electrode.

For example, in the step of applying the electrode in the form of the composite electrode using the aerosol deposition method it is possible to apply conduction network materials for forming a multiplicity of conduction networks within the composite electrode and active material for storing ions within the composite electrode. A conduction network can be conductive both for ions and for electrons. In order to implement ionic conductivity, for example suitable solid body ion conductors can be used as the conduction network material. In order to implement electronic conductivity, for example carbon compounds, metallic, organic or ceramic materials can be used as the conduction network material. For example oxides, phosphates, sulfides or fluorides can be used as the active material. The different materials for forming the conduction networks and for storing the ions can be present in powder form and be deposited by aerosol deposition to form the composite electrode. As a result, a desired composition of the composite electrode can be set very precisely.

In addition, in the step of applying the electrode in the form of the composite electrode using the aerosol deposition method, structure material for forming porosity and additionally or alternatively elasticity of the composite electrode can be applied. Porosity can be understood to mean that the composite electrode has a multiplicity of cavities. As a result of the porosity it is possible to reduce mechanical loads during the operation of the galvanic element. In particular, as a result of the porosity it is possible to absorb a change in volume occurring in the active material during the charging or discharging of the galvanic element, and to reduce the mechanical load on the rest of the components of the galvanic element.

In the step of applying the separator, the separator can be applied using an aerosol deposition method. The separator can therefore be applied with the same method as at least one of the electrodes. This facilitates the production of the galvanic element.

The method can comprise a step of applying a second separator to the second electrode, a step of applying a further first electrode to the second separator, a step of applying a third separator to the further first electrode, and a step of applying a further second electrode to the third separator. In this way, a plurality of galvanic regions or galvanic cells which are stacked one on top of the other can be formed. A layered stack composed of a plurality of galvanic cells can therefore be formed. The galvanic cells can be connected electrically to one another, for example, in a parallel circuit or a series circuit. In further steps, further separators and further electrodes can be applied. In this way, galvanic elements which are dimensioned in different ways can easily be implemented.

In this context, in the step of applying the first separator, the first separator can be applied in such a way that the first separator covers an edge, facing a first side of the galvanic element, of the first electrode. In the step of applying the second separator, the second separator can be applied in such a way that the second separator covers an edge, facing a second side of the galvanic element, of the second electrode. In the step of applying the third separator, the third separator can be applied in such a way that the third separator covers an edge, facing the first side of the galvanic element, of the further first electrode. The first side and the second side of the galvanic element can be arranged opposite one another. By means of such an embodiment of the separator layers, the first and second electrodes can be respectively connected to one another in an electrically conductive fashion. As a result, a parallel circuit of two galvanic cells which are arranged stacked one on top of the other can be implemented.

According to one embodiment, the aerosol deposition method can be carried out using a plurality of nozzles for applying substances. For example, different substances or substance mixtures for depositing a layer can be applied via a plurality of nozzles. Different nozzles for applying substances can also be used for different layers. Through the use of a plurality of nozzles it is possible to speed up the production of the galvanic element, and more complex layer compositions can be implemented.

A galvanic element has the following feature:
a layered stack composed of a first electrode, a second electrode and a separator arranged between the first electrode and the second electrode, wherein at least one of the electrodes is a composite electrode which is deposited using an aerosol deposition method.

The layered stack can be arranged on a substrate. The electrodes and the separator can each be in the form of thin layers. The electrodes can each have a connection for connecting an electric lead.

The composite electrode can constitute an electrode which is deposited from one or more powder mixtures with different substances using an aerosol deposition method. The composite electrode can contain conduction network material for forming a multiplicity of conduction networks within the composite electrode and active material for storing ions within the composite electrode.

The composite electrode of the galvanic element can be porous. As a result of the porosity, the composite electrode can be pulled through by a multiplicity of cavities. The porosity can be suitable to reduce mechanical loads on the galvanic element during the operation of the galvanic element. In order to avoid leaving too much volume unused, the porosity should be minimized with respect to the mechanical loads, that is to say, for example, should exceed the percentage proportion of the change in volume of the active material during operation only by a safety margin which is as small as possible.

Additionally or alternatively, the composite electrode can be embodied in an elastic fashion. For this purpose, during the aerosol deposition elastic materials can be incorporated into the layer forming the composite electrode. As a result of suitable elasticity of the composite electrode it is possible, in turn, to reduce mechanical loads on the galvanic element.

The galvanic element can be formed by means of a layered battery arrangement with composite electrodes, which layered battery arrangement ensures, in the composite arrangement, the transportation of ions and electrons and the storage of electrochemical energy and can absorb the mechanical loads during operation and suitably buffer them. The production of individual composite electrodes or of such a layered battery arrangement by means of an aerosol deposition method provides the possibility of adjusting the composition of a deposited composite layer from the start to close to the target composition during operation.

As a result, a cost-effective method for developing and producing micro batteries is provided. All the layers of the galvanic element can be produced in the same method on the same system. Correspondingly there is no transportation, no atmosphere break, no high vacuum process alternating with surroundings processes or glove box processes. The method can be scaled to relatively large substrate surfaces and can even be developed, with adaptations, so as to be compatible with rolling. If appropriate, the movement speed and the movement direction of the belt and/or parallel and/or serial arrangement of the nozzles of a device for aerosol deposition are required here. Rapid development of the micro batteries is permitted by virtue of the fact that different compositions can be tried out and further processed quickly. The layer thicknesses of the individual layers of the galvanic element determine the capacity, the flatness and the costs of the battery and can be rapidly adapted. This results in a flexibility in the product. The lateral dimensions can both be defined by means of masks and set in relatively rough stages by means of the grating during the application process. This results in flexibility in the development and in the product. The alternating deposition of electrodes and separators, associated with the simple lateral structurability of the individual deposited layers, makes it possible to produce either individual battery cells with relatively thick electrodes for a maximum storage capacity or else a plurality of cells with relatively thin electrodes in a series circuit or parallel circuit for relatively high voltages or currents. This results in flexibility in use. The scaling of the method permits disruptive batteries for use in objects of everyday use such as cell phones, media players or other accumulator-operated devices.

BRIEF DESCRIPTION OF THE DRAWINGS

The disclosure will be explained in more detail by way of example below with reference to the appended drawings, in which.

DETAILED DESCRIPTION

In the following description of preferred exemplary embodiments of the present disclosure, identical or similar reference symbols are used for the similarly acting elements illustrated in the various figures, wherein a repeated description of these elements is not given.

Figure 1:
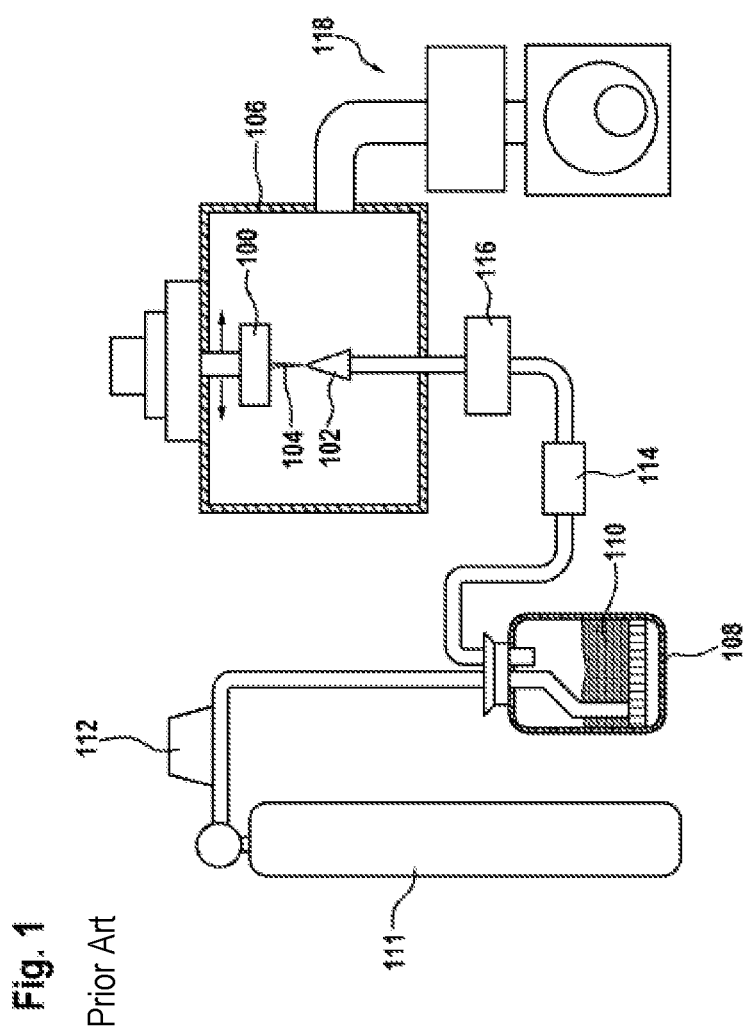
FIG. 1 shows a schematic illustration of a device for aerosol deposition according to the prior art.

FIG. 1 shows a schematic illustration of a device for aerosol deposition according to the prior art. A layer can be deposited on a substrate 100 using such a device. For this purpose, a nozzle 102 can direct a particle jet 104 onto the substrate 100. Substances or particles contained in the particle jet 104 can be deposited on the substrate 100 and form the layer. According to this exemplary embodiment, the substrate 100 can be moved in order to form the layer, both transversely with respect to the particle jet 104 and parallel with respect to the particle jet 104, that is to say in the x, y and z directions, here. The nozzle 102 and the substrate 100 are arranged in a deposition chamber 106.

A powder 110 for the particle stream 104 is arranged in an aerosol chamber 108. Gas in a region of the aerosol chamber 108 which is located under the powder 110 is directed into the aerosol chamber 108 from a gas bottle 111 and a mass flow controller 112. An aerosol which is composed of particles of the powder 110 and gas from the gas bottle 112 is conducted via a further line to the nozzle 102 via a filter 114 and a classifier 116 and applied to the substrate 100 as the particle stream 104 or aerosol stream.

A pipe leads from the deposition chamber 106 to a pump arrangement 118.

The aerosol deposition can be understood to be a deposition method from micro electronics and micro system technology for coating substrates. A corresponding aerosol deposition method is also referred to as an ADM. In the aerosol deposition method, the powder 110 is introduced into the aerosol container 108 and typically fed at high speed to the substrate 100 via the nozzle 102 by means of an inert carrier gas. As a result of the impact, the particles of the powder 110 break up and the fragments of the particles subsequently consolidate to form a layer with a small particle size and typically a high layer quality. The powder 110 can be composed of a material with monomodal grain size distribution, but can also have multimodal grain size distribution or materials. For example, with such a method it is possible to produce garnet layers (LiLaZrO:Al) as barrier layers in a battery system. In addition, active materials for battery systems can be deposited. In order to produce a galvanic element such as is shown, for example, in the following figures, a composite electrode of the galvanic element can also be deposited. For this purpose, a suitable powder mixture can be used as powder 110 or different powders can be applied via one nozzle, or different powders can be applied simultaneously or successively to the substrate 100 via different nozzles.

Figure 2:
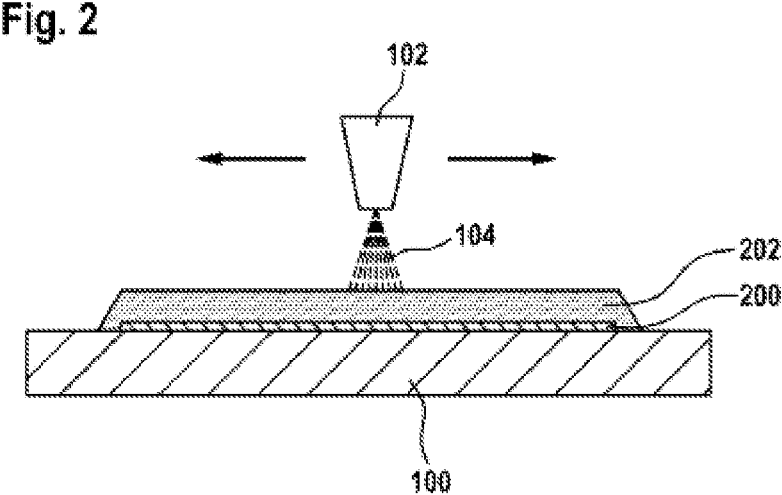
FIG. 2 shows a schematic illustration of the deposition of a layer of a galvanic element according to an exemplary embodiment of the present disclosure.

FIG. 2 shows a schematic illustration of the deposition of a layer of a galvanic element according to an exemplary embodiment of the present disclosure. A substrate 100 is shown. A nozzle 102 of a device for aerosol deposition such as is shown, for example, in FIG. 1 moves in parallel and at a distance from a surface of the substrate 100. A particle stream 104 flows through the nozzle 102 and strikes the surface of the substrate 100. One or more substrate layers 200 can be located on the surface of the substrate 100. The particle stream 104 forms the specified layer of the galvanic element on the surface of the substrate 100. The layer formed by the particle stream 104 is a first electrode 202 of the galvanic element. According to this exemplary embodiment, the first electrode 202 is embodied as a first composite electrode.

According to this exemplary embodiment, lateral structuring of the first electrode 202 occurs over the travel distance of the nozzle 102 characterized by arrows. According to one alternative exemplary embodiment, for example shadow masks can also be used for the structuring.

Figure 3:
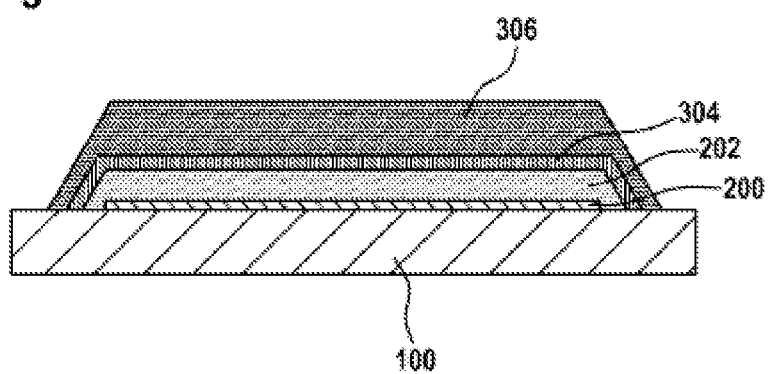
FIG. 3 shows a schematic illustration of a galvanic element according to an exemplary embodiment of the present disclosure.

FIG. 3 shows a schematic illustration of a galvanic element according to an exemplary embodiment of the present disclosure. The galvanic element has, in addition to the substrate 100 and the first electrode 202 which, as described in FIG. 2, is a first composite electrode, a separator 304 and a second electrode 306. According to this exemplary embodiment, the second electrode 306 is embodied as a second composite electrode.

The first electrode 202, the separator 304 and the second electrode 306 are each formed by layers. The separator 304 is arranged between the first electrode 202 and the second electrode 306. The separator 304 and the second electrode 306 can be formed by aerosol deposition, in accordance with the first electrode 202.

According to this exemplary embodiment, the separator 304 covers a main surface, facing away from the substrate 100, of the first electrode 202, and additionally the side edges of the first electrode 202. The first electrode 202 is therefore completely covered by the separator 304 and edges of the separator 304 adjoin the surface of the substrate 100. The second electrode 306 correspondingly covers a main surface, facing away from the substrate 100, of the separator 304, and additionally the side edges of the separator 304. The separator 304 is therefore covered completely by the second electrode 306, and edges of the second electrode 306 adjoin the surface of the substrate 100.

The illustrated structure of a layered battery arrangement composed of the first electrode 202, the separator 304 and the second electrode 306 is illustrated only in exemplary form. One of the electrodes 202, 306 has cathode properties, and the other of the electrodes 202, 306 has anode properties. The electrode with an anode property can also be another layer instead of a composite electrode.

Layer thicknesses of the electrodes 202, 306 and of the separator 304 can be selected according to the desired properties of the galvanic element. The electrode capacity is determined here by the volume of the electrodes 202, 306. For example, a thickness of between 10 μm and 500 μm, preferably between 30 μm and 100 μm can be selected for the electrodes 202, 306, in order to obtain an electrode capacity which is greater than 1 mAh/cm$^2$, and preferably greater than 2 mAh/cm$^2$. The layer thickness can be deposited either in an individual layer or else in a plurality of relatively thin electrode layers of a cell stack with the same properties. The separator function is determined by the quality of the separator layer. The latter can be embodied to be as thin as possible, but without holes. For example, the layer thickness of the separator 304 can be several 100 nm or less. However, typical values can also be between 1 μm and 10 μm.

A suitable substrate 100 can be used for the galvanic element. For example, the substrate 100 can be a semiconductor wafer. Packaging materials, for example a mold wafer or a housing, can also be used as the substrate 100. In addition, the substrate 100 can be formed by a rear side of a solar cell or a metal foil or a compound film, for example for rolling processes.

According to one exemplary embodiment, the first electrode 202 is embodied as a composite electrode with cathode properties. In order to form the first electrode 202 in the form of a composite layer with cathode properties, deposition is carried out from a premixed suitable powder mixture by means of an aerosol deposition method such as is described, for example, with reference to FIG. 1. The first electrode 202 is composed of a plurality of conduction networks, both electronic and ionic, as well as active materials for storing ions and of a suitable structure for absorbing the changes in mechanical volume such as occur in the electrochemical operation of the galvanic element. A corresponding suitable structure can be formed by porosity or elasticity of the first electrode 202. The premixed powder mixture includes suitable materials which give rise to the corresponding properties.

When Li ion chemistry is used, all suitable materials can be used as active materials, for example LiCoO2, LiFePO4, LiMn2O4, mixed oxides such as NCM, NCA, or other oxides, phosphates, sulfides or fluorides.

In the case of Li/S chemistry, sulfur or a sulfur compound such as, for example, Li2S can be used as the active material.

However, suitable active materials can also be selected for the construction of, for example, NiMH-based, zinc-based or sodium-based memory systems. The separator electrode layers and opposing electrode layers have to be correspondingly adapted.

For example, graphite, graphene, soot, CNTs and other carbon compounds, but also metallic, organic or further ceramic components such as, for example, lithium titanate, or mixtures of the specified components, can be used as electronic conduction networks.

Suitable solid body ion conductors, for example on a LiPON basis, garnets (LiLaZrO), preferably suitably doped, further phosphates, sulfides or suitable mixtures, for example LiP—LiS, or else further ceramic components such as, for example, lithium titanate, or mixtures of the specified components, are possible as ionic conduction networks.

The functions of the ionic and of the electronic conduction network can be modeled with one or more suitable mixed conductors, which have both ionic and electronic conductivity, such as for example lithium titanate, in a single physico-chemical conduction network.

For the implementation of the mechanical structure for forming porosity or elasticity, for example sacrificial materials can also be deposited, said materials being subsequently expelled in the further course of the process or in a selective step. Flexible filler materials, for example organic or inorganic binders, can also be fed into the powder mixture. Additionally or alternatively, the process parameters and the material parameters can also be correspondingly set in such a way that a certain porosity is set.

As an alternative to the first electrode 202, the second electrode 306 can also be embodied as a composite electrode with cathode properties. In this case, the second electrode 306 can be produced in a corresponding way by an aerosol deposition method.

In order to construct the separator 304, deposition can occur, preferably also by means of an aerosol deposition method, of one or more suitable separator layers onto the first electrode 202, here in the form of the cathode layer. The separator 304 is designed to conduct the ions of the selected memory materials with as little resistance as possible, but to block electrons as completely as possible. Suitable materials for the separator 304 are those which can be used for ionic conduction networks, for example LiPON, further phosphates and/or sulfides, garnets (LiLaZrO, preferably doped) or suitable mixtures such as for example LiP—LiS. A plurality of separators 304 may be necessary, for example, for the chemical stability of the separators 304 in relation to the respective electrodes 202, 306.

The deposition of the individual separator layers of the separator 304 occurs optimized to the effect that the layer quality is suitably good, that is to say no pinholes or other interference points occur, in order to have no creepage current or short circuit between the electrode layers which form the two electrodes 202, 306, and that the contact with the lower electrode layer which forms the first electrode 202 is sufficiently good to ensure the requested battery properties, for example with respect to the current capacity.

Without adversely affecting the abovementioned requirements, given a suitable material selection, a separator layer which forms the separator 304 can also be provided with filler materials for improving the mechanical properties. The necessary ion conductivity is, however, to be retained, and porosity is not desired in a separator layer, since it would corresponding to the abovementioned pinholes.

According to one exemplary embodiment, the second electrode 306 is embodied as an electrode layer with anode properties. In order to form the second electrode 306, a further electrode layer with anode properties is preferably also subsequently deposited by an aerosol deposition process on one or more separator layers forming the separator 304. This anode layer which forms the second electrode 306 can be composed, for example, of metallic Li, ceramic materials (for example LiTiO) or, in turn, a composite layer with suitable conduction networks and suitable memory materials, for example carbon, metal alloys, silicon or germanium. The component proposals of an anode composite layer are identical to the cathode composite layers with the exception of the active materials. The deposition of the anode layer is to take place in an optimized fashion to the effect that the contact with the separator layer which forms the separator 304 is sufficiently good to ensure the required battery properties, for example with respect to the current capacity.

The sequence of the cathode layer or anode layer can also be reversed, that is to say a first electrode 202 in the form of an electrode layer with an anode character is firstly deposited, and then the separator 304 and subsequently the second electrode 306 in the form of a second electrode layer with a cathode character.

The galvanic element can have further peripheral layers. For this purpose, in addition to the core battery layers described above, in the form of the electrodes 202, 306 and the separator 304, it is, if appropriate, also possible to deposit further suitable auxiliary layers onto suitable substrates or onto the upper electrode 306 by means of an aerosol deposition method. This includes, for example, battery layers for preventing storage ions from diffusing out, current collectors for conducting the electrons from and to the outer circuit, passivation layers for preventing ambient interferences such as, for example, moisture, oxygen or carbon compounds from diffusing in. However, in this context the suitability of the deposition method and the total system with respect to the function and costs have to be taken into account. Ceramic powdrous materials can preferably be deposited by means of an aerosol deposition method, with a restriction also a number of metal compounds such as NdFeB, but not all by far.

For the construction of the galvanic element as a total system, the sequence of the cathode layer and anode layer can also be reversed, thus an electrode layer with an anode character is deposited first, and then the separator 304 and subsequently the second electrode layer with the cathode character. If appropriate, intermediate steps such as tempering or junction layers in the process sequence have to be taken into account also.

The materials of the layered battery arrangement of the galvanic element can preferably be of a ceramic nature, preferably of an organic nature, e.g. polymers, but can also be mixed systems.

According to one exemplary embodiment, the galvanic element shown in FIG. 3 is a mainly ceramic micro battery which can be produced in a thin layer method. The micro battery is flat owing to the production methods of the individual layers. The target thickness of the micro battery is restricted with the storage capacity of the micro battery. A high storage capacity ($>1$ mAh/cm$^2$) is possible since the composite layer of the electrodes 202, 306 permits a greater usable layer thickness than in the case of pure active material thin layers. A high cycle number and a long calendar life can be realized because liquid electrolytes are dispensed with and owing to the adjustable porosity. A high level of temperature stability can be achieved by means of suitable material selection for the layers of the micro battery. Cost-effective manufacture is possible owing to a method for all core layers, that is to say the electrodes 202, 306 and the separator 304 of the battery. Given suitable scaling, the method can also be used to manufacture relatively large batteries.

Figure 4:
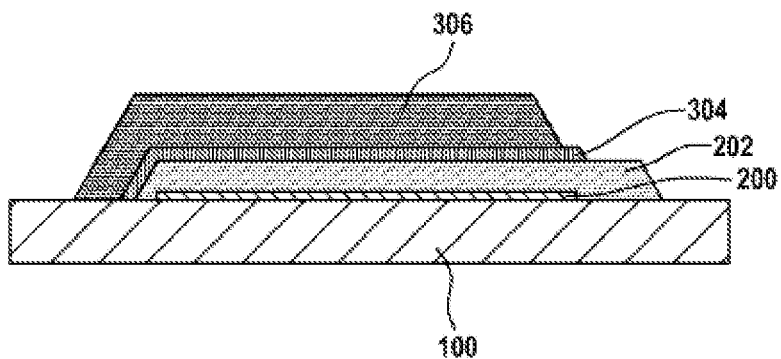
FIG. 4 shows a schematic illustration of a galvanic element under construction, according to an exemplary embodiment of the present disclosure.

FIG. 4 shows a schematic illustration of a galvanic element which is under construction, according to an exemplary embodiment of the present disclosure. The galvanic element has, as described with reference to FIG. 3, a substrate 100, a first electrode 202, a separator 304 and a second electrode 306. On a first side the separator 304 extends, as described with reference to FIG. 3, over the edge of the first electrode 202 and the second electrode 306 extends over the edge of the separator 304 as far as the substrate 100. In contrast, on an opposite, second side an end section of the first electrode 202 is exposed, that is to say is not covered by the separator 304. Likewise, an end section of the separator 304 is exposed, that is to say is not covered by the second electrode 306.

Figure 5:
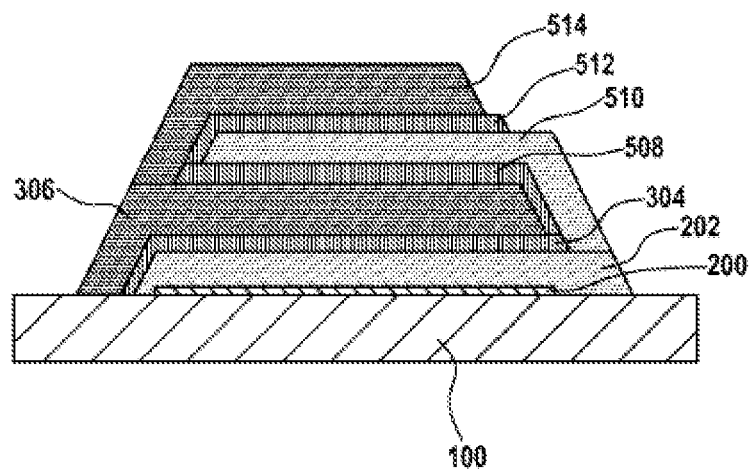
FIG. 5 shows a schematic illustration of a galvanic element according to an exemplary embodiment of the present disclosure.

In further process steps, further layers are applied to the layered battery arrangement shown in FIG. 4, as is shown, for example, with reference to FIG. 5.

FIG. 5 shows a schematic illustration of a galvanic element according to an exemplary embodiment of the present disclosure. In this case, a second separator 508 is applied to the second electrode 306 shown in FIG. 4. On the first side specified in FIG. 4, the second separator 508 does not extend completely as far as the edge of the second electrode 306, but on the second side lying opposite it extends beyond the edge of the second electrode 306 as far as the first separator 306.

A further first electrode 510 is applied to the second separator 508. On the first side, the further first electrode 510 does not extend completely as far as the edge of the second separator 508, but on the second side lying opposite it extends beyond the edge of the second separator 508 as far as the first electrode 202. The first electrode 202 and the further first electrode 510 are therefore connected to one another in an electrically conductive fashion.

A third separator 512 is applied to the further first electrode 510. On the second side, the third separator 512 does not extend completely as far as the edge of the further first electrode 510, but on the first side lying opposite it extends beyond the edge of the further first electrode 510 as far as the second separator 508.

A further second electrode 514 is applied to the third separator 512. On the second side, the further second electrode 512 does not extend completely as far as the edge of the third separator 510, but on the first side lying opposite it extends beyond the edge of the third separator 512 as far as the second electrode 306. The second electrode 306 and the further second electrode 514 are therefore connected to one another in an electrically conductive fashion.

The first electrode 202, the first separator 304 and the second electrode 306 form a first galvanic cell. The further first electrode 510, the third separator 512 and the further second electrode 514 form a second galvanic cell, which is connected in parallel with the first galvanic cell. In a corresponding way, one or more further galvanic cells can be positioned on the second galvanic cell.

FIGS. 4 and 5 therefore show the structure of a layered battery arrangement with a plurality of cells which are arranged in parallel, which construction is produced by means of the grating of the nozzle above the substrate 100 during the deposition. FIG. 4 shows here the deposition of the first cell with an offset arrangement of the individual layers 202, 304, 306, and FIG. 5 shows an arrangement with two cells which are arranged in parallel.

Figure 6:
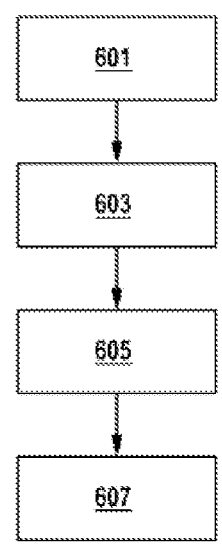
FIG. 6 shows a flow chart of a method for producing a galvanic element according to an exemplary embodiment of the present disclosure.

FIG. 6 shows a flow chart of a method for producing a galvanic element according to an exemplary embodiment of the present disclosure. This can be, for example, the galvanic element shown in FIG. 3.

In a step 601, a suitable substrate is provided. In a step 603, a first electrode of the galvanic element is applied to a surface of the substrate. In a step 605, a separator is applied to the first electrode. In a step 607, a second electrode is applied to the separator. In this context, in step 603, and additionally or alternatively in step 607, the corresponding electrode is applied using an aerosol deposition method. In step 605 the separator can likewise be applied using an aerosol deposition method.

For example, as shown in FIG. 2, a composite layer can be directly applied from a suitable powder mixture by means of an aerosol deposition method. If appropriate, mechanical structure properties are optimized by means of process parameters.

One exemplary embodiment includes the use of a plurality of powder mixtures which are introduced with differing weighting into the nozzle or are deposited simultaneously via a plurality of nozzles. This can be used, for example, to develop new composite layers, but also in order, for example, to introduce the different conduction networks of the two electrodes or the ion conductor which is present in all the layers in each case from an existing powder mixture. According to one exemplary embodiment, all the ion conductor components can be fed from a single (powder) source. The number of powder mixtures is preferably less than the number of material components used.

A further exemplary embodiment provides the structure of a composite layer composed of a plurality of thin layers which are deposited in rapid chronological alternation from the described different powder mixtures, be it from one or from a plurality of nozzles. The composite layer which is ready for use is then formed by means of the mechanical input of energy during the deposition or by means of other activation steps.

As is shown in FIG. 3, different powders, however, are used at least during the application of a layered battery arrangement which is preferably applied in a chronological succession in the same system for aerosol deposition. Such a layered battery arrangement is composed of a cathode layer, separator and anode layer as well as, if appropriate, of auxiliary layers.

The lateral dimensions, for example of the layered battery arrangement shown in FIG. 3, can be defined very quickly and relatively coarsely by programming means over the relative travel distance of the nozzle by means of the substrate, but also with more expenditure and relatively high precision and resolution by means of shadow masks.

As shown in FIG. 5, the rapid definition of the lateral dimensions by programming means also permits battery arrangements with a plurality of cells which are connected in series or in parallel to be produced.

Series connection can be achieved, for example, by repetition of the layer sequence illustrated in FIG. 3, but with enlarged separator faces. A parallel connection can be produced, for example, as illustrated in FIG. 5, quickly by means of cathode layers and anode layers which are arranged offset in respective opposite directions. An advantage of the parallel arrangement is significantly improved current-carrying capacity (power) of the battery compared to a battery with the same capacity in a cell with correspondingly thicker electrodes.

Such layered battery arrangements can be produced both at the wafer level and also on relatively large substrates or band substrates. In the case of a small substrate area, a nozzle is typically moved over the substrate, or the substrate over the nozzle. In the case of relatively large substrates, the method can be correspondingly parallelized, or in the case of band substrates can also be serialized, that is to say the nozzles are fixedly installed, preferably with an adapted shape, and the substrate is moved past under them.

In a further exemplary embodiment, the deposition can take place reactively in that during the aerosol deposition method a reactive, if appropriate even plasma-activated, gas is used to set the desired layer properties instead of an inert gas.

The battery structure, the form of the particles and shape of the particles and the grain boundaries in the layers and, in particular, remaining porosities can be selected specifically for the batteries to be implemented or the underlying production method.

A corresponding galvanic element can be used, for example, in micro batteries for autonomous sensors. Scaling to form mobile devices is also possible. If appropriate, scaling for relatively large accumulators for electric vehicles or domestic storage facilities can also take place.

The exemplary embodiments which are described and are shown in the figures are selected only by way of example. Different exemplary embodiments can be combined with one another completely or with respect to individual features. An exemplary embodiment can also be supplemented by features of a further exemplary embodiment. In addition, method steps according to the disclosure can be repeated and executed in a sequence other than that described. If an exemplary embodiment comprises an "and/or" logic operation between a first feature and a second feature, this is to be understood as meaning that according to one embodiment the exemplary embodiment has both the first feature and the second feature, and according to a further embodiment the exemplary embodiment has either only the first feature or only the second feature.

The invention claimed is:

1. A method for producing a galvanic element, comprising:
   applying a first electrode to a substrate using aerosol deposition;
   applying a first separator directly to the first electrode using aerosol deposition; and
   applying a second electrode directly to the first separator using aerosol deposition, wherein at least one of the first and second electrodes is applied as a composite electrode;
   applying a second separator directly to the second electrode using aerosol deposition;
   applying a further first electrode directly to the second separator using aerosol deposition;
   applying a third separator directly to the further first electrode using aerosol deposition; and
   applying a further second electrode directly to the third separator using aerosol deposition, wherein:
     the first electrode and the further first electrode are in direct contact with one another; and
     the second electrode and the further second electrode are in direct contact with one another.

2. The method as claimed in claim 1, wherein applying the at least one of the first and second electrodes as the composite electrode comprises applying different substances using aerosol deposition in order to form the composite electrode.

3. The method as claimed in claim 1, wherein applying the at least one of the first and second electrodes as the composite electrode comprises applying (i) conduction network material configured to form a multiplicity of conduction networks within the composite electrode and (ii) active material configured to store ions within the composite electrode.

4. The method as claimed in claim 1, wherein:
   applying the first separator comprises applying the first separator in such a way that the first separator covers an edge, facing a first side of the galvanic element, of the first electrode,
   applying the second separator comprises applying the second separator in such a way that the second separator covers an edge, facing a second side of the galvanic element, of the second electrode, and
   applying the third separator comprises applying the third separator in such a way that the third separator covers an edge, facing the first side of the galvanic element, of the further first electrode.

5. The method as claimed in claim 1, wherein the applying of at least one of the first electrode, the first separator, and the second electrode using aerosol deposition includes using a plurality of nozzles configured to apply different substances.

6. The method as claimed in claim 5, wherein the different substances are applied successively by different nozzles of the plurality of nozzles.

7. The method as claimed in claim 5, wherein the different substances are applied simultaneously by different nozzles of the plurality of nozzles.

8. The method as claimed in claim 1, wherein applying the at least one of the first and second electrodes as the composite electrode comprises applying structure material in such a way that the composite electrode is porous.

9. The method as claimed in claim 1, wherein applying the at least one of the first and second electrodes as the composite electrode comprises applying structure material in such a way that the composite electrode is elastic.

* * * * *